Aug. 30, 1938.    H. E. KOENIG    2,128,829
BROODER STOVE REGULATOR
Filed Aug. 14, 1936    2 Sheets-Sheet 2
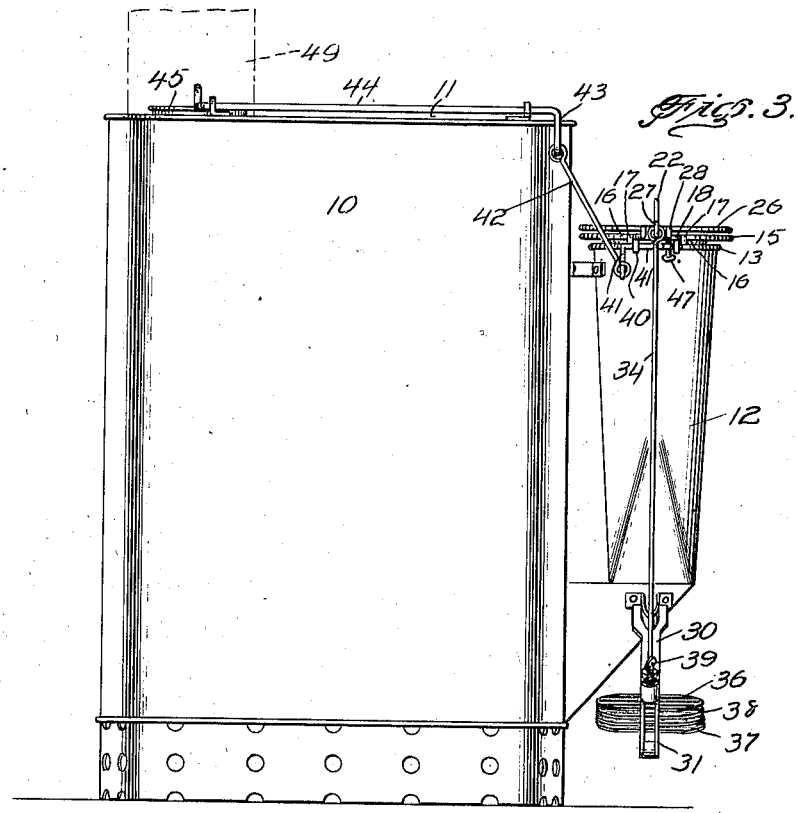
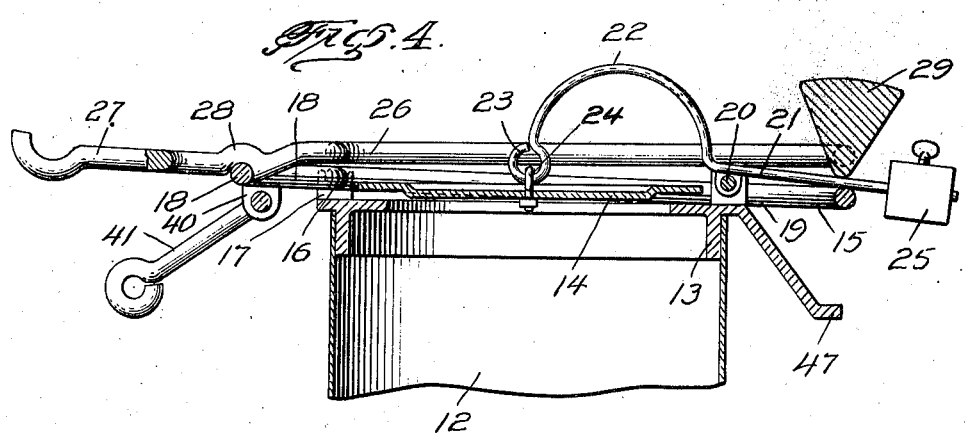
Hilmer E. Koenig,
INVENTOR
BY Victor J. Evans & Co.
ATTORNEYS Patented Aug. 30, 1938

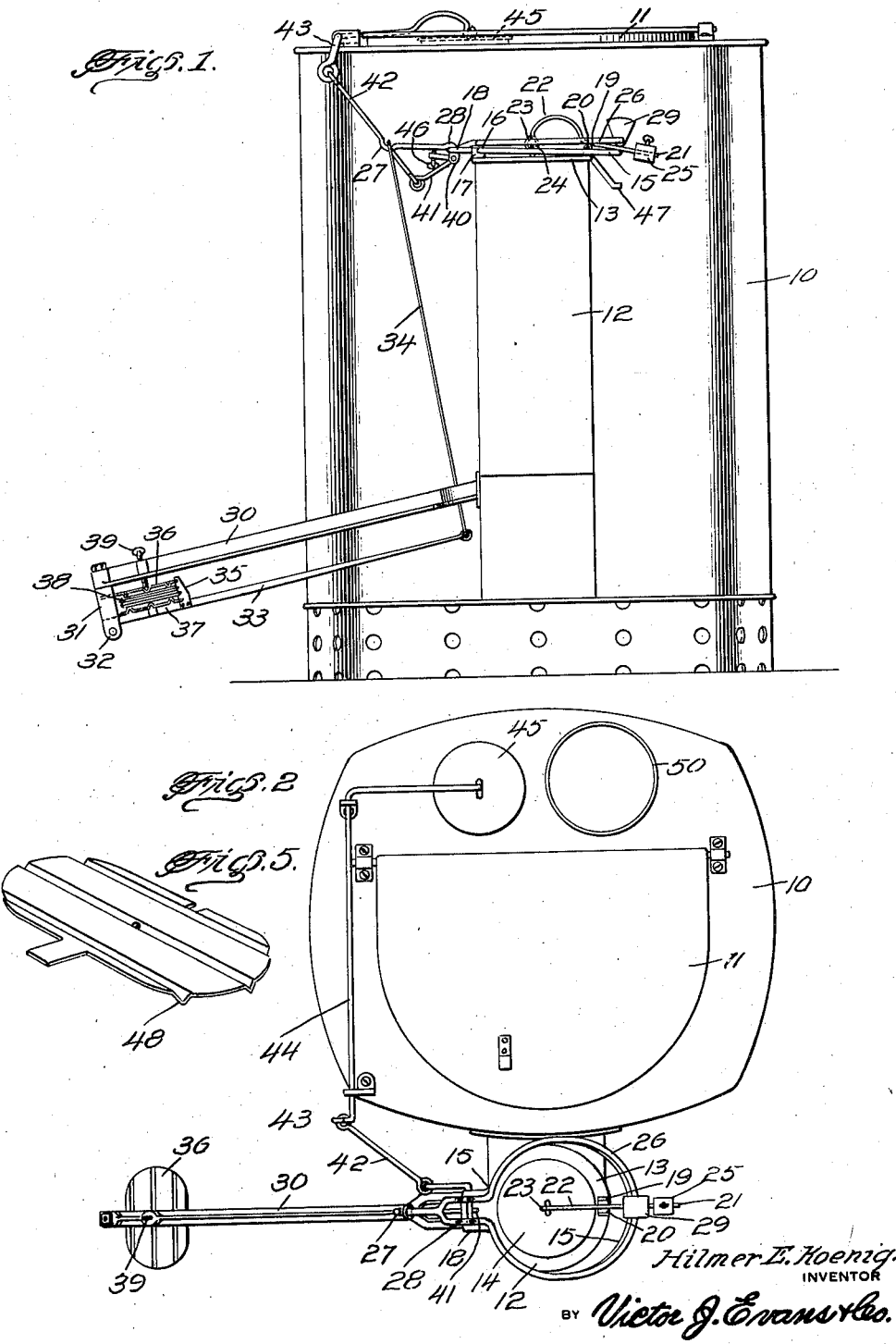

2,128,829

UNITED STATES PATENT OFFICE 2,128,829

BROODER STOVE REGULATOR

Hilmer E. Koenig, Farrar, Mo.

Application August 14, 1936, Serial No. 96,081

1 Claim. (Cl. 236—6)

The invention relates to a draft regulator for stoves and more especially to thermostatic brooder stove regulators.

The primary object of the invention is the provision of a regulator of this character, wherein through the use of a thermostatic device in the form of an expanding and contracting wafer and certain levers and connections these being weighted the draft damper of a heating stove can be accurately and positively regulated and controlled so as to enable the maintenance of a predetermined temperature within a brooder and the same automatically effected.

Another object of the invention is the provision of a regulator of this character, wherein the thermostat will not be strained through a rise in temperature after the draft damper has closed and also will eliminate affecting the thermostat by radiation of heat either directly or indirectly thereto, free circulation of air around the outside of the thermostat and over and beneath the same being had, while the balancing of the force between the several wafers of the thermostat is assured to permit a parallel expansion of such wafers.

Another object of the invention is the provision of a regulator of this character, wherein uniform temperature is assured within a brooder so as to effect propagation of healthy chicks, the regulator in its entirety being of novel construction as self-adjustment and regulation is had for the proper working of the stove.

A further object of the invention is the provision of a regulator of this character, wherein the thermostatic device is of a kind permitting air circulation about the same for the procurement of all of the energy of said device so that a proper maintenance of uniform temperature within the brooder can be arrived at, the regulator being adaptable for any and all kinds of stoves employed for the heating of brooders.

A still further object of the invention is the provision of a regulator of this character, which is comparatively simple in its constuction, thoroughly reliable and efficient in its operation, automatically acting, positive in the working thereof and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a front elevation of a stove with the regulator constructed in accordance with the invention applied thereto.

Figure 2 is a top plan view.

Figure 3 is a side elevation.

Figure 4 is a fragmentary vertical sectional view.

Figure 5 is a perspective view of one of the supports for the thermostatic device.

Similar reference characters indicate corresponding parts throughout the several views in the drawings.

Referring to the drawings in detail, 10 designates generally a heater stove embodying within a fire chamber which is accessible from the top through a vertical swinging hinged cover or lid 11 for the fueling of the said stove, it being understood, of course, that the fire chamber is equipped with a grate for the fuel although in substitute a burner may be placed within the stove for the heating operation of the latter, these being no part of the present invention.

At one side of the stove is a draft inlet flue or column 12 which opens at its lower end into the lower portion of said stove and the upper end is open, there being fitted in the latter a damper seating ring or casting 13 for a disk-like damper 14 operated by the regulator constituting the present invention and hereinafter fully described.

Arranged at the upper open end of the flue 12 is a rocking loop 15 which is trunnioned at 16 in fulcrum bearings 17 rising from the casting 13 at one side thereof, the loop 15 being formed at its trunnion point with a cradle extension 18. The casting 13 at a point diametrically opposite the bearings 17 has formed therewith and rising therefrom pivot bearings 19 accommodating a horizontal pivot 20 swingingly connected with the said casting a weighted lever 21 having an inner bowed end portion 22 with an eye terminal 23 linked with a coupling eye 24 mounted centrally in the damper 14, the outer end of this lever 22 being adjustably fitted with a weight 25 and said outer end overhangs and contacts with the loop 15 so that the portion of this loop remote from the fulcrum bearings 17 will be urged downwardly under the weight 25 on the lever 22 and upward lift will be had upon the damper 14 by said lever.

In overhanging position with respect to the yoke 15 is a second rocking yoke 26 which at one side thereof is formed with a hook extension 27 which has fulcrum points 28 with the cradle 18 and diametrically opposite these fulcrum points the said second yoke 26 carries a substantially triangular shaped weight 29 which has bearing upon the straight outer portion of the lever 21, the weight 25 on the said lever 21 being a balance weight with respect to the damper 14 while the weight 29 is an overbalancing weight.

Fixed to one side of the flue 12 near the lower end thereof and inclined laterally therefrom is a hanger 30 carrying at its outer end a pivot fork 31 which depends therefrom and in which is pivoted at 32 a trigger arm or lever 33 which at its other end has loose connection with a link 34 hung upon and suspended from the hook extension 27. This arm or lever 33 next to the pivot 32 has thereon a guide 35 for top and bottom corrugated supporting plates 36 and 37, respectively, between which is located a thermostatic device in the form of an expansible and contractible wafer 38, the top plate being abutted against an adjustable screw 39 fitting the hanger 30. Thus it will be seen from Figure 1 of the drawings that when the wafer 38 expands or contracts it regulates the trigger 33 which in turn actuates the yokes 15 and 26 for the automatic opening and closing of the damper 14. The cradle 18 has formed therewith the bearings 40 for the pivotal connection therewith of an adjustable lever 41 to which is loosely connected a link 42, the same being also loosely connected to the crank 43 of a regulating arm 44 for a heat check valve 45 fitted in the top of the stove 10 and through sequence in the operation of the regulator such valve 45 will be automatically opened and closed and in this fashion regulating the draft to the stove 10 and also checking the heat therefrom.

The lever 41 is adjustable by a set screw 46 coacting with the extension 27 for the proper timing of the action of the heat check 45.

In the operation of the regulator the expansion of the thermostatic wafer 38 forces the trigger 33 downwardly causing a pull upon the link 34 connected with the damper operated mechanism, the link 34 being connected with the hook extension 27 causes the rocking yoke 26 to lift and simultaneously therewith the rocking yoke 19 will tilt at the fulcrum point 16 and the weight 29 will rise upwardly from the yoke 15 while the said yoke 15 will press upon the lever 22 thus moving the damper 14 closed. When the damper 14 is in closed position the yoke 15 will hold it in place as the wafer 38 continues to expand resultant from the rising of a certain degree of temperature within the stove and in sequence the check 45 will be automatically opened until the fire within the stove is checked. When the temperature lowers or the heat lessens within the stove then the damper 14 will begin to open and the check 45 automatically close. Thus in this manner a uniformity of temperature can be maintained within a brooder.

The casting 13 has a stop 47 for the yoke 15 so as to limit the downward swing of said yoke.

The supports 36 and 37 are provided with corrugations 48 so as to permit the passage of air above and below and over the wafer 38 both at its top and bottom for the accurate working of such thermostatic device.

The outlet flue for the stove 10 is indicated at 49, the opening for said flue being at 50 in the top of the stove 10.

What is claimed is:

A regulator of the character described comprising a damper bodily movable to opening and closing positions with respect to an inlet draft flue, a rocking loop trunnioned at one side of said damper for fulcrum action and having a cradle extension at its trunnioned point, a weighted lever pivotally supported with respect to said damper at the side thereof diametrically opposite to the trunnioned point of the loop, a connection centrally of said damper and loosely fitted with said lever, said lever being in overhanging contacting relation to the loop, a rocking yoke having fulcrum connection with the cradle extension, a weight carried by said yoke and contacting with the lever at the point of its contact with the loop, a hook extension on said yoke at its fulcrum with the cradle extension, bearings on the cradle extension, an adjustable lever pivoted in said bearings and having a crank for linkage with the crank of a regulating arm for a check heat valve of a stove, a stationary hanger below said hook extension, a trigger carried by and pivotally supported spaced from said hanger, a thermostat unit carried on the trigger and disposed between the latter and the said hanger, supports above and below the thermostat unit and having corrugations for spacing the latter therefrom and allowing free air flow therebetween, and a link hung upon said hook extension and loosely connected with the trigger.

HILMER E. KOENIG.